United States Patent [19]

Dreyfus et al.

[11] 3,760,063
[45] Sept. 18, 1973

[54] SYNTHESIS OF PHOTOCHROMIC SODALITE BY A DIFFUSION PROCESS

[75] Inventors: Russell W. Dreyfus, Cross River; William P. Hornberger, New York, both of N.Y.

[73] Assignee: International Business Machines Corporation, Armonk, N.Y.

[22] Filed: June 18, 1971

[21] Appl. No.: 154,651

[52] U.S. Cl.............................. 423/328, 252/301.4
[51] Int. Cl...... C01b 33/26, C09k 1/54, C09k 1/68
[58] Field of Search........................ 23/367; 423/328

[56] References Cited
UNITED STATES PATENTS 2,882,244   4/1959   Milton............................ 23/113 UX
2,882,243   4/1959   Milton................................. 23/113

OTHER PUBLICATIONS

Kirk, "Journal of the Electrochemical Society," Vol. 101, Pages 461–465 (1954).

Williams et al., "Journal of the American Ceramic Society," Vol. 52, Pages 139–145 (1969).

Primary Examiner—M. Weissman
Attorney—Hansel L. McGee et al.

[57] ABSTRACT

A novel, simple and inexpensive method of synthesizing photochromic sodalite is provided. The method is particularized by the diffusion of NaCl and sulfur into the zeolite $(Na_2O \cdot Al_2O_3 \cdot 2SiO_2) \cdot xH_2O$, known commercially as Molecular Sieve No. 4A. A mixture of this zeolite, NaCl and a sulfur compound is heated in the presence of forming gas and for a time sufficient to cause diffusion of NaCl and sulfur into the lattice structure of the zeolite. The photochromic sodalite produced can be used in display units and in computer memories.

4 Claims, No Drawings

SYNTHESIS OF PHOTOCHROMIC SODALITE BY A DIFFUSION PROCESS

BACKGROUND OF THE INVENTION

INTRODUCTION

Photochromism is the property of a material to exhibit different optical absorption bands depending upon its history of optical illumination. That is, it can be in a colored or bleached state, depending upon its exposure to light of different wavelengths. Photochromic sodalite is found in nature and is known as Hackmanite. It is of technological importance because of its reversible photochromic properties. It has a zeolite structure having voids filled with sodium, chlorine and sulfur. Chemically, it is $3(Na_2O\cdot Al_2O_3\cdot 2SiO_2)\cdot 2NaCl(S_2^-)$ i.e., some of the chloride ions are replaced by sulfur ions.

PRIOR ART

Role of Sulfur in the Luminescence and Coloration of Some Aluminosilicates, Russell D. Kirk, Journal of The Electrochemical Society, September 1954, page 461.

Irradiation Colours and Luminescence, A Contribution to Mineral Physics Dr. Karl Przibram, London Pergamon Press Limited (1956).

Synthetic Photochromic Sodalite, E. F. Williams et al, Journal of The American Ceramic Society, Volume 52, No. 3, page 139, March 1969.

The Structure of Some Sodium and Calcium Aluminosilicates, Linus Pauling, Proceedings of The National Academy of Sciences, Volume 16, No. 7, July 15, 1930.

The publication of Kirk describes an attempt to synthesize photochromic sodalite by simultaneously synthesizing zeolite and filling the interstices thereof with NaCl and sulfur. This required the fusing of $Al_2O_3$, $SiO_2$, $Na_2CO_3$, NaCl and sulfur in the form of $Na_2SO_4$ or $Na_2S$. This required several sintering and grinding steps to obtain complete reaction of the starting materials. Thus it is a very time consuming operation.

Similarly Williams et al prepares photochromic sodalite by sintering mixtures of the above compounds with repeated grinding and heating steps. In another method Williams heats a mixture of Zeolite X, a material somewhat different than Zeolite 4A, and NaCl and dehydrates the mixture under vacuum for 24 hours, after which the material is exposed to $H_2S$ or $SO_2$. It should be noted that Zeolite X does not contain any Na ions, hence this process is retarded since a basic change in the zeolite structure must occur before the spherical structure of Zeolite 4A is approached. Subsequently, the product is heated in hydrogen to obtain photochromism therein. In yet a third method Williams prepares an efficient photochromic material via a hydrothermal synthesis. The latter method is a two-step process in which the starting materials are thoroughly mixed and subsequently heated under pressure. While the hydrothermal method of preparation provides a more efficient photochromic product, it also requires more elaborate and expensive equipment.

SUMMARY OF THE INVENTION

The present invention relates to a simplified method of synthesizing highly efficient photochromic sodalite. The method of the invention entails the initial heating of a mixture comprising from about 80 percent to about 20 percent by weight $Na_2O\cdot Al_2O_3\cdot 2SiO_2\cdot xH_2O$ (Zeolite Molecular Sieve No. 4A), from about 10 percent to about 40 percent by weight of NaCl, and from about 10 percent to about 40 percent by weight of $Na_2SO_3$, at a temperature of about 200° C. to about 350° C in vacuo for a time sufficient to remove water of hydration, about 3 hours. The mixture is thereafter heated at a temperature range of about 650° C to about 950° C in the presence of forming gas (90 percent $N_2$ + 10 percent $H_2$). Heating is continued for a period of from about 16 hours to about 60 hours depending upon the temperature used. For example, the higher the temperature, the shorter will be the reaction time. After heating the samples for the prescribed period, the reaction product is cooled. The product is found to be a powder material having a white (or translucent) color in the presence of visible light and a magenta color after exposure to 3100A ultraviolet light. It has an optical absorption band in the visible light range of 5200A.

In preparing photochromic sodalite different ratios of NaCl:$Na_2SO_3$ can be used to alter the kinetics associated with photochromism. For example, increasing the amount of sulfur in the form of $Na_2SO_3$, increases the ease of coloring. However, the ease of bleaching is decreased. Chemical compounds other than NaCl and sulfur can be used. When NaBr is used in place of NaCl the optical absorption band in the visible light range will be shifted from 5200A to somewhat longer wavelengths, e.g., 5600A. NaCl can be substituted with NaI, LiBr or LiI, each material having its own absorption band. On the other hand other activators may conceivably be of use, e.g., $Na_2MnO_4$ or $NaRuO_4$.

PREFERRED EMBODIMENT OF THE INVENTION

EXAMPLE I

About 60 percent by weight of $Na_2O\cdot Al_2O_3\cdot 2SiO_2\cdot xH_2O$ together with 20 percent by weight of NaCl and 20 percent by weight of $Na_2SO_3$ are dry-mixed. The powdered material in a quartz reaction vessel is placed into a furnace and heated for about 3 hours to remove water of hydration. The temperature is then raised to about 850° C and heating is continued for about 16 hours in a forming gas atmosphere. The reaction product is then cooled. A chemical analysis on the white crystalline product gave the following results:

Al — 11.4 percent + 0.1, Si — 10.8 percent + 0.7, Na — 21.1 percent ± 0.6,

Cl = 16.6 percent ± 0.2 and S = 2.20 percent ± 0.02

The material was found to have an absorption band at 5200A. It had photochromic sensitivity of about 0.05 to 0.08 j/cm². The efficiency of the material was determined by timed exposures.

EXAMPLE II

The method of Example I was repeated except 20 percent of $Na_2S$ was used in place of the $Na_2SO_3$. The product obtained had the same properties as in Example I.

What is claimed is:

1. A method of preparing photochromic sodalite from the zeolite having the formula $(Na_2O\cdot Al_2O_3\cdot 2SiO_2)\cdot xH_2O$ wherein said $xH_2O$ is the water of hydration in said zeolite, said method comprising the steps of a heating a mixture of about 20 percent to 80 percent by weight of said zeolite, about 10 percent to about 40 percent by weight of an alkali halide selected from the group consisting of NaCl, NaBr, LiCl and LiBr, and about 10 percent to 40 percent by weight of an activator sodium salt selected from the group consisting of $Na_2SO_3$, $Na_2S$, $Na_2MnO_4$ and $NaRuO_4$, wherein S, Mn and Ru are said activators, at a temperature and for a time sufficient to remove said water of hydration;

b thereafter, further heating said mixture from which said water of hydration has been removed in a gas comprising about 90 percent $N_2$ and 10 percent $H_2$ at a temperature in the range of about 650° C to about 950° C and continuing said last-named heating for a time sufficient to cause the selected alkali halide and the selected activator to diffuse into the lattice structure of said zeolite;

c cooling the reaction product obtained in said step (b), said reaction product being said zeolite with said alkali halide and said activator in the crystal lattice of said zeolite.

2. A method of preparing photochromic sodalite from the zeolite having the formula $(Na_2O \cdot Al_2O_3 \cdot 2SiO_2)xH_2O$ wherein said $xH_2O$ is the water of hydration in said zeolite, said method comprising the steps of:

a heating a mixture of about 60 percent by weight of said zeolite, 20 percent by weight of NaCl and 20 percent by weight of an activator material selected from the group consisting of $Na_2S$ and $Na_2SO_3$ at a temperature of about 200° C to about 350° C for about 3 hours to remove said water of hydration;

b thereafter heating said mixture from which said water of hydration has been removed in a gas comprising about 90 percent $N_2$ and 10 percent $H_2$ in the temperature range of about 650° C to about 950° C for about 16 to 60 hours to cause said NaCl and the S from said $Na_2SO_3$ to diffuse into the lattice structure of said zeolite; and c thereafter cooling the reaction product obtained in said step (b), said reaction product being said zeolite with said NaCl and said S in the crystal lattice of said zeolite, said reaction product containing the following constituents:

Al = 11.4% + 0.1         Na = 21.1% ± 0.6
Cl = 16.6% ± 0.2         S = 2.20% ± 0.02
Si = 10.8% + 0.7 said reaction product having an absorption band at 5200A and a photochromic sensitivity of about 0.05 to 0.08 j/cm².

3. A method as defined in claim 2 wherein said activator material is $Na_2SO_3$.

4. A method as defined in claim 2 wherein said activator material is $Na_2S$.

* * * * *